Patented Oct. 23, 1945

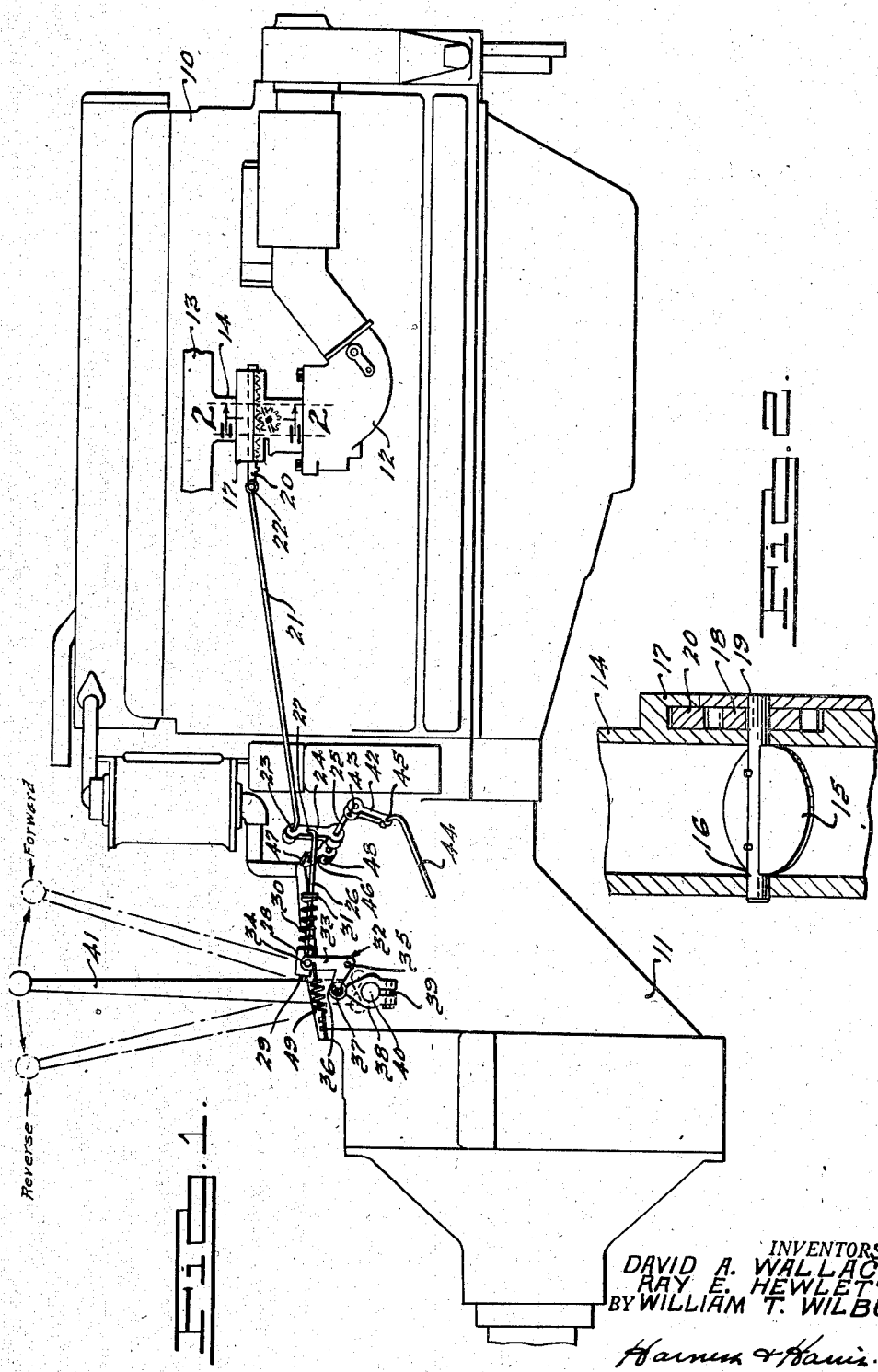

2,387,370

UNITED STATES PATENT OFFICE 2,387,370

SPEED CONTROL FOR ENGINES

David A. Wallace, Ray E. Hewlett, and William T. Wilbur, Detroit, Mich., assignors to Chrysler Corporation, Highland Park, Mich., a corporation of Delaware Application February 14, 1944, Serial No. 522,254

3 Claims. (Cl. 74—472)

This application relates to a means for decelerating and accelerating an engine. More specifically it relates to means of this kind operable upon interruption of a driving connection between the engine and part or parts to be driven.

It is known to interconnect a throttle valve for an engine and a clutch connecting the engine and driven parts such as a transmission in such a way that disengagement of the clutch moves the throttle valve to an idle position, and reengagement of the clutch returns the throttle valve from the idle position to a more open position. The connection between the clutch and the throttle valve is simple, and no great problem is encountered, for the clutch is disengaged by movement in one direction and reengaged by movement in the opposite direction. However, in some cases there is no clutch between the engine and the transmission, the disconnecting effect obtained by the disengagement of a clutch being produced merely by movement of a gear-shift lever to a neutral position. There may be simply a single forward speed and a single reverse speed so arranged that the shift lever is pushed forwardly from a central position to shift the transmission from neutral to forward, and it is pushed rearwardly from the central position to shift the transmission from neutral to reverse. Movements of shift lever from either forward or reverse to the central position bring the transmission to neutral. Now, if the engine is to decelerate upon placing of the transmission in neutral and this is to be brought about by the shift lever, provision must be made to insure that both the forward movement from reverse to neutral and the rearward movement from forward to neutral cause the throttle valve to be moved to idle position, and likewise that the return movements of the shift lever in opposite direction accomplish a movement of the throttle valve away from idle position.

An object of the present invention is to provide improvements in means for decelerating an engine.

A further object is the provision of improved means controlling deceleration and acceleration of an engine by means of a shifting member for a transmission associated with an engine. In a broad sense, the gear shift lever or control member is to move in one direction to neutral from one drive-transmitting arrangement and in another direction to neutral from another drive-transmitting arrangement. In a more limited sense, the control member is to move forwardly to neutral from reverse and is to move rearwardly to neutral from forward.

Still another object is to provide the aforementioned deceleration control in conjunction with a manually-operated throttle control.

Other objects will appear from the disclosure.

In the drawing,

Fig. 1 is a side view of an engine to which the invention of the present application is shown applied; and Fig. 2 is a sectional view taken on the line 2—2 of Fig. 1.

The reference character 10 designates an engine to the rear of which is connected a transmission 11. The transmission may be of the type as shown in Fromm Patent No. 1,954,200 in which there is a reverse and a single forward speed. At the side of the engine 10 are a carburetor 12 and a manifold 13. An intake line 14 connects the carburetor 12 with the manifold 13. As shown in Fig. 2, a throttle valve 15 is positioned within the intake line 14 being secured to a rod 16, one end of which is mounted in one side of the intake line 14 and the other end of which is mounted in an enlarged portion 17 of the intake line 14. A gear 18 is secured by a key 19 to the rod 16 carrying the throttle valve 15 and is positioned within the enlarged portion 17. A rack 20 engages the gear 18 and is mounted within the enlarged portion 17 of the intake line 14. A link 21 is pivotally connected at its forward end as indicated at 22, to the rear end of the rack 20. The rear end of the link 21 is formed as a bent portion 23, which is pivotally connected to a lever 24 pivotally mounted on a rock shaft. The front end of a link 26 is formed as a bent portion 27 pivotally connected to the lever 24. The rear end of the link carries a sleeve 28 slidably mounted upon the rod 26 and retained thereon by a nut 29. A coil spring 30 retained between a disc 31 secured at a mid point on the link 26 and the sleeve 28 urges the sleeve 28 rearwardly against the nut 29. A bellcrank 32 has one arm 33 pivotally connected at 34 to the sleeve 28. The bellcrank is pivotally mounted upon the transmission 11 as indicated at 35. The other arm 36 of the bellcrank rotatably carries a roller follower 37. The follower 37 engages a cam 38 secured by a bolt 39 to a projecting boss 40 upon a gear shift lever or control member 41. An arm 42 is pinned as indicated at 43, to one end of the rock shaft 25 so as to be rockable therewith. A link 44 is connected by a forward bent end 45 to the arm 42. An arm 46 having a projecting lug 47 is pinned to the other end of the shaft 25 as indicated at 48.

The transmission 11 is of the type that involves a single forward speed and a single reverse speed. There is no clutch between the engine 10 and the transmission 11. When the control member 41 is in the full line position, the transmission is in neutral. Forward movement of the control member 41 to the one dash-dot position shown causes the transmission to be shifted from neutral to forward speed. Rearward shifting of the control member 41 to the dash-dot position shown causes the transmission to be shifted to reverse speed.

It is desirable that when the transmission control member 41 is shifted from either reverse or forward to neutral, the throttle valve 15 be brought to closed position so that the engine idles when the transmission is in neutral. This is accomplished by the arrangement of parts shown and described. When the control member is in the neutral position shown in full lines, the high mid portion of the cam 38 engages the follower 37 moving the bellcrank angularly to the right. The link 26 also moves to the right and acts through the lever 24 to move the link 21 to the right. The rack 20 moves to the right, rotating the gear 18 and bringing the throttle valve 15 toward idle position. When the control member 41 is shifted from neutral either to reverse or to forward the cam 38 moves with the control member 41 moving the high portion of the cam out of engagement with the follower 37 so that the bellcrank 32 is moved angularly to the left under the action of a spring 49. The rack 20 is moved to the left under the action of the links 21 and 26 and the throttle valve 15 is rotated back to an open position. If it is desired that the throttle valve be not opened as far as the spring 49 might cause it to be due to the pull to the left exerted upon the links 21 and 26 and the rack 20, the arm 46 is appropriately positioned so that the lug 47 acts as a stop to the leftward movement of the arm 24. The arm 46 with its lug 47 may be manually positioned through the link 44 and the arm 42.

If it is desired to open the throttle valve 15 upon starting the engine, when, of course, the transmission will be in neutral, the lever 24 is rotated counterclockwise by means not shown. The rod 26 moves rearwardly sliding through the sleeve 28 as the spring 30 yields. The sleeve 28 and the bellcrank 32 remain in the position shown in Fig. 1.

As the transmission 11 is shifted from neutral to forward or to reverse, the engine is speeded up gradually, for the transmission may be so arranged that it will be engaged in forward or reverse at positioning of the control member 41 only slightly away from the full-line neutral position of Fig. 1. With such positioning the throttle valve 15 is opened only slightly, but it continues to a more complete opening as the control member moves to either of dash-dot positions. It is possible with this arrangement to use the control member 41 as a speed control when the engine is driving.

It will be apparent from the foregoing description that a new and novel construction has been provided for decelerating an engine upon shifting the transmission from either of two drive transmitting positions to neutral and accelerating the engine upon return of the transmission from neutral to either of the drive transmitting positions.

The intention is to limit the invention only within the scope of the appended claims.

We claim:

1. In combination, means for feeding fuel to an engine and including a part movable in one direction from a first position determining a full flow of fuel to the engine to a second position determining a reduced flow of fuel to the engine and in the opposite direction from the second position to the first position, a control member for a transmission associated with the engine shiftable in one direction for bringing the transmission from forward to neutral and in another direction for bringing the transmission from reverse to neutral, and means connecting the control member and the said part of the fuel-feeding means for causing shifting of the control member from forward to neutral or from reverse to neutral to move the said part from the first position to the second position for reducing the amount of fuel fed to the engine, said last mentioned means comprising a cam mounted for movement with the control member, a follower engaging the cam, a pivotally mounted bellcrank carrying the follower on one arm, a first link, a slidable element mounted on one end of the first link and carried by the other arm of the bellcrank, resilient means acting between the slidable element and the first link to urge the slidable element toward the said one end of the link, a pivotally mounted arm connected to the other end of the first link, a second link connecting the arm and the said part of the fuel-feeding means, and means associated with the arm for limiting and controlling the first position of the said part.

2. In combination, means for feeding fuel to an engine, including a part movable in one direction to reduce the amount of fuel fed and in the opposite direction to increase the amount of fuel fed, a control member for a transmission associated with the engine shiftable in one direction for bringing the transmission from forward to neutral and in another direction for bringing the transmission from reverse to neutral, and means connecting the control member and the said part included in the fuel-feeding means for causing shifting of the control member from forward to neutral or from reverse to neutral to move the said part in its said one direction for reducing the amount of fuel fed to the engine, the means connecting the control member and the part included in the fuel-feeding means comprising a cam mounted for movement with the member, a follower engaging the cam, an arm pivotally mounted at one end and carrying the follower at the other end, link means connected at one end to the said part of the fuel-feeding means, a slidable element mounted on the other end of the link means and connected with the arm, and resilient means urging the slidable element toward the said other end of the link means.

3. In combination, means for feeding fuel to an engine, including a part movable in one direction to reduce the amount of fuel fed and in the opposite direction to increase the amount of fuel fed, a control member for a transmission associated with the engine shiftable in one direction for bringing the transmission from forward to neutral and in another direction for bringing the transmission from reverse to neutral, and means connecting the control member and the said part included in the fuel-feeding means for causing shifting of the control member from forward to neutral or from reverse to neutral to move the said part in its said one direction for reducing the amount of fuel fed to the engine, said connecting means including link means associated with the said part of the fuel means, an element associated with the control member shiftable with respect to the link means, and resilient means acting between the link means and the shiftable element for providing for reduction of fuel feed during forward or reverse positions of the control member and increase of fuel feed during neutral position of the control member.

DAVID A. WALLACE.
RAY E. HEWLETT.
WILLIAM T. WILBUR.